US009155965B2

(12) United States Patent
Wickett et al.

(10) Patent No.: US 9,155,965 B2
(45) Date of Patent: Oct. 13, 2015

(54) POKER COMMUNITIES

(71) Applicants: Justin Wickett, Tiburon, CA (US); Timothy Wickland, San Francisco, CA (US); Shawn Carnes, Los Angeles, CA (US)

(72) Inventors: Justin Wickett, Tiburon, CA (US); Timothy Wickland, San Francisco, CA (US); Shawn Carnes, Los Angeles, CA (US)

(73) Assignee: Zynga Inc., San Francisco, CA (US)

( * ) Notice: Subject to any disclaimer, the term of this patent is extended or adjusted under 35 U.S.C. 154(b) by 242 days.

(21) Appl. No.: 13/670,376

(22) Filed: Nov. 6, 2012

(65) Prior Publication Data

US 2014/0128138 A1    May 8, 2014

(51) Int. Cl.
| | |
|---|---|
| *G06F 17/00* | (2006.01) |
| *G06F 19/00* | (2011.01) |
| *A63F 13/30* | (2014.01) |
| *A63F 13/795* | (2014.01) |
| *G07F 17/32* | (2006.01) |

(52) U.S. Cl.
CPC .............. *A63F 13/12* (2013.01); *A63F 13/795* (2014.09); *G07F 17/32* (2013.01); *G07F 17/3237* (2013.01); *G07F 17/3293* (2013.01)

(58) Field of Classification Search
CPC ... A63F 13/10; A63F 13/12; A63F 2300/556; A63F 2300/5546; A63F 2300/5566; A63F 13/795
See application file for complete search history.

(56) References Cited

U.S. PATENT DOCUMENTS

| | | | |
|---|---|---|---|
| 5,755,621 A | 5/1998 | Marks et al. | 463/42 |
| 5,833,540 A | 11/1998 | Miodunski et al. | 463/42 |
| 5,971,849 A | 10/1999 | Falciglia | 463/16 |
| 6,039,648 A | 3/2000 | Guinn et al. | 463/16 |
| 6,077,162 A | 6/2000 | Weiss | 463/26 |
| 6,450,500 B1 | 9/2002 | Miller | 273/292 |
| 6,695,695 B2 * | 2/2004 | Angel | 463/13 |
| 7,066,465 B2 | 6/2006 | Daines | 273/292 |
| 7,255,351 B2 | 8/2007 | Yoseloff et al. | 273/274 |
| 8,425,330 B1 * | 4/2013 | Kislyi et al. | 463/42 |
| 8,459,650 B2 | 6/2013 | Baseel | 273/292 |
| 8,727,850 B2 | 5/2014 | Burnside et al. | 463/13 |
| 2002/0045474 A1 | 4/2002 | Singer et al. | 463/20 |
| 2002/0091833 A1 * | 7/2002 | Grimm et al. | 709/227 |
| 2003/0070178 A1 * | 4/2003 | Boyd et al. | 725/110 |
| 2003/0078102 A1 * | 4/2003 | Okita et al. | 463/42 |
| 2003/0222400 A1 | 12/2003 | Collins et al. | 273/274 |
| 2005/0054446 A1 | 3/2005 | Kammier et al. | 463/42 |
| 2005/0192097 A1 * | 9/2005 | Farnham et al. | 463/42 |
| 2005/0253338 A1 | 11/2005 | Daines | 273/292 |
| 2008/0139315 A1 * | 6/2008 | O'Connor et al. | 463/42 |
| 2010/0306672 A1 * | 12/2010 | McEniry | 715/753 |
| 2011/0045886 A1 * | 2/2011 | Hayes et al. | 463/11 |
| 2012/0074647 A1 | 3/2012 | Hall | 273/274 |
| 2012/0283023 A1 * | 11/2012 | O'Kelley et al. | 463/42 |
| 2012/0302332 A1 * | 11/2012 | Buhr | 463/29 |

(Continued)

*Primary Examiner* — Lawrence Galka
(74) *Attorney, Agent, or Firm* — Martine Penilla Group LLP

(57) ABSTRACT

Methods, systems, and computer programs are presented for providing play areas to communities of players in an online game. One method includes an operation for identifying attributes of players in the online game. A characteristic that is common to a subset of players is determined in the online game, where the characteristic is based on the attributes of players in the online game. The method further includes an operation for creating a playing area in the online game, such that the subset of players are allowed to play in the playing area, but other players in the online game, that are outside the subset of players, are disallowed from playing in the playing area. The subset of players is then enabled to play in the playing area with other players from the subset of players.

17 Claims, 9 Drawing Sheets

(56) References Cited

U.S. PATENT DOCUMENTS

| | | | |
|---|---|---|---|
| 2013/0102392 A1* | 4/2013 | Nakata et al. | 463/42 |
| 2013/0143669 A1* | 6/2013 | Muller | 463/42 |
| 2013/0254680 A1* | 9/2013 | Buhr et al. | 715/753 |
| 2014/0128163 A1* | 5/2014 | Almog | 463/42 |

* cited by examiner

POKER COMMUNITIES

BACKGROUND

1. Field of the Invention

The present invention relates to methods for improving social interactions in online games, and more particularly, methods, computer programs, and systems for providing play areas to online communities.

2. Description of the Related Art

Online games that allow players to interact with other players have become popular. Some online games, such as online poker, fantasy games, online chess, etc., may have millions of players playing the game simultaneously, although the players may be organized in groups that play in playing areas (e.g., a poker table) that host a limited number of players at a time. Online game operators, also referred to as social game operators, harness the power of online social networks to design games that allow players to interact with their friends within the games.

In some online poker games, users can play with their friends by going to an online poker game and selecting to play in the same table as one or more friends. However, there is no way to restrict the players that may access the poker table. This means that online poker players may have to play with any type of poker player at all times.

It is in this context that embodiments arise.

SUMMARY

Methods, devices, systems, and computer programs are presented for providing play areas to player communities. It should be appreciated that the present embodiments can be implemented in numerous ways, such as a method, an apparatus, a system, a device, or a computer program on a computer readable medium. Several embodiments are described below.

In one embodiment, a method includes an operation for identifying attributes of players in the online game. A characteristic that is common to a subset of players is determined in the online game, where the characteristic is based on the attributes of players in the online game. The method further includes an operation for creating a playing area in the online game, such that the subset of players are allowed to play in the playing area, but players in the online game, that are outside the subset of players, are disallowed from playing in the playing area. The subset of players is then enabled to play in the playing area with other players from the subset of players.

In another embodiment, a method includes an operation for determining a first subset of players in the game that have a common first characteristic, the first common characteristic being based on attributes of players in the game. In addition, the method includes an operation for determining a second subset of players in the game that have a common second characteristic. A playing area is created in the game where a first team integrated by members of the first subset of players competes against a second team integrated by members of the second subset of players. The first team and the second team are enabled to compete in the playing area.

In yet another embodiment, a method includes an operation for identifying attributes of players in an online poker game, and another operation for determining a characteristic that is common to a subset of players in the online poker game, the characteristic being based on the attributes of players in the online poker game. A first poker table is created, where the subset of players is allowed to play in the first poker table, but players in the game outside the subset of players are disallowed from playing in the first poker table. The subset of players is then enabled to play in the first poker table.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, systems, and computer programs for providing playing areas to communities of players in an online game. It will be apparent, that the present embodiments may be practiced without some or all of these specific details. In other instances, well known process operations have not been described in detail in order not to unnecessarily obscure the present embodiments.

Figure 1:
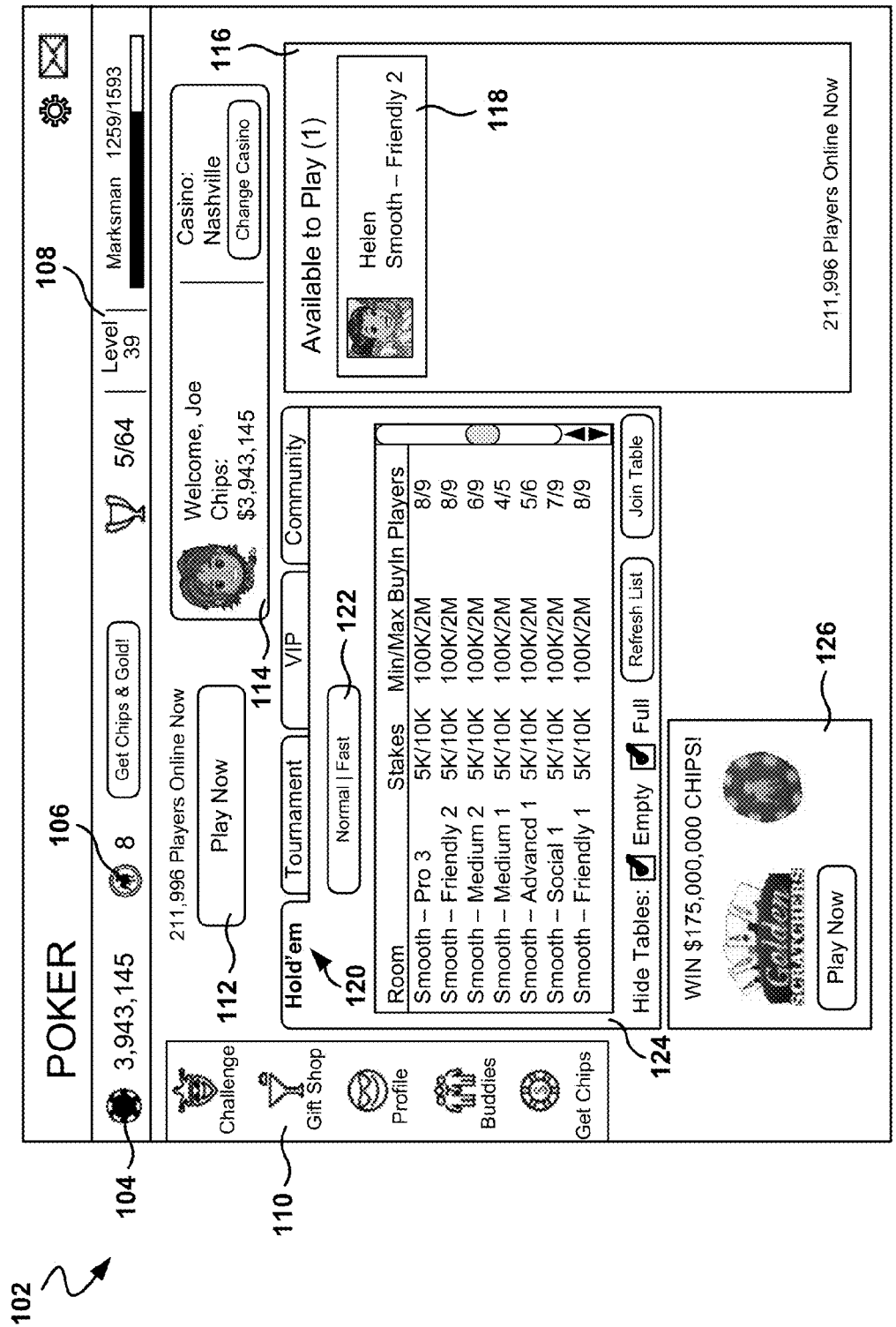
FIG. 1 illustrates an embodiment of a web page for playing a poker game.

FIG. 1 illustrates an embodiment of a webpage 102 for playing a poker game. The online poker game may be accessed in a website of the publisher of the online poker game, or the online poker game may be embedded within the webpage of a social networking site. The illustrated page serves as a portal, also referred to herein as a lobby, for accessing various features of the online poker game.

In one embodiment, the poker game is played with virtual chips 104, which may be purchased with real cash, and may be won or lost while playing the online poker game. The virtual chips may also be utilized to buy items in the online game area. Menu area 110 gives the player options to buy items in the gift shop, buy chips with legal currency, manage the player's profile, etc. In addition, the player may buy a second type of virtual currency 106 to buy items in the game, or gain access to special features.

Webpage 102 shows the lobby of a poker game, which includes several options for the player. From the lobby, the player is able to select a poker table to play poker with other players. Player status area 114 provides information about the player, such as the amount of chips available for playing, the casino that the player is in, etc. Additional information may also be found in the top information bar, such as level 108 achieved by the player.

The poker table selection area 124 provides the user options to select a poker table. The poker table selection area 124 includes options for playing Texas Hold Them poker, playing in a tournament, playing in a VIP table reserved for special players (e.g., players with a minimum number of poker chips), and playing in a community table. In the poker table selection area 124, the tab for playing Texas Hold Them poker 120 is selected and a list of poker tables is provided. Each poker table includes a name, the betting stakes, minimum and maximum buy-in to sit down at the table, and the number of players sitting at the table together with the maximum number of players for the table (e.g., 4/5, which means that 4 players are playing poker in a poker table that holds a maximum of 5 players). In addition, option button 122 enables the player to select tables that play at a first speed (e.g., "Normal") or tables that play at a second speed (e.g., "Fast").

An option to let the game select a table for the player 112 is also provided in webpage 102. In addition, a friend board 116 lists friends of the player that are currently playing poker. The friends of the player may be friends from the social network, or friends from within the game network. If the player selects one of the people listed 118 in friend board 116, the player will be taken to the same poker table where the friend is currently playing. In addition, webpage 102 may include other areas with additional game related information, such as announcement or promotional area 126.

It is noted that the some of the embodiments described herein are described with reference to a poker game. However, the principles presented herein to provide user communities within a game may be used for any game. For example, online communities may be utilized in any casino online game (e.g., Black Jack, Roulette, Craps, Slots machines, Hi-Lo games, etc.). In addition, the embodiments presented here may also be used in non-casino games, such as battle games, adventure games, construction games, etc. The embodiments illustrated herein should therefore not be interpreted to be exclusive or limiting, but rather exemplary or illustrative.

Figure 2:
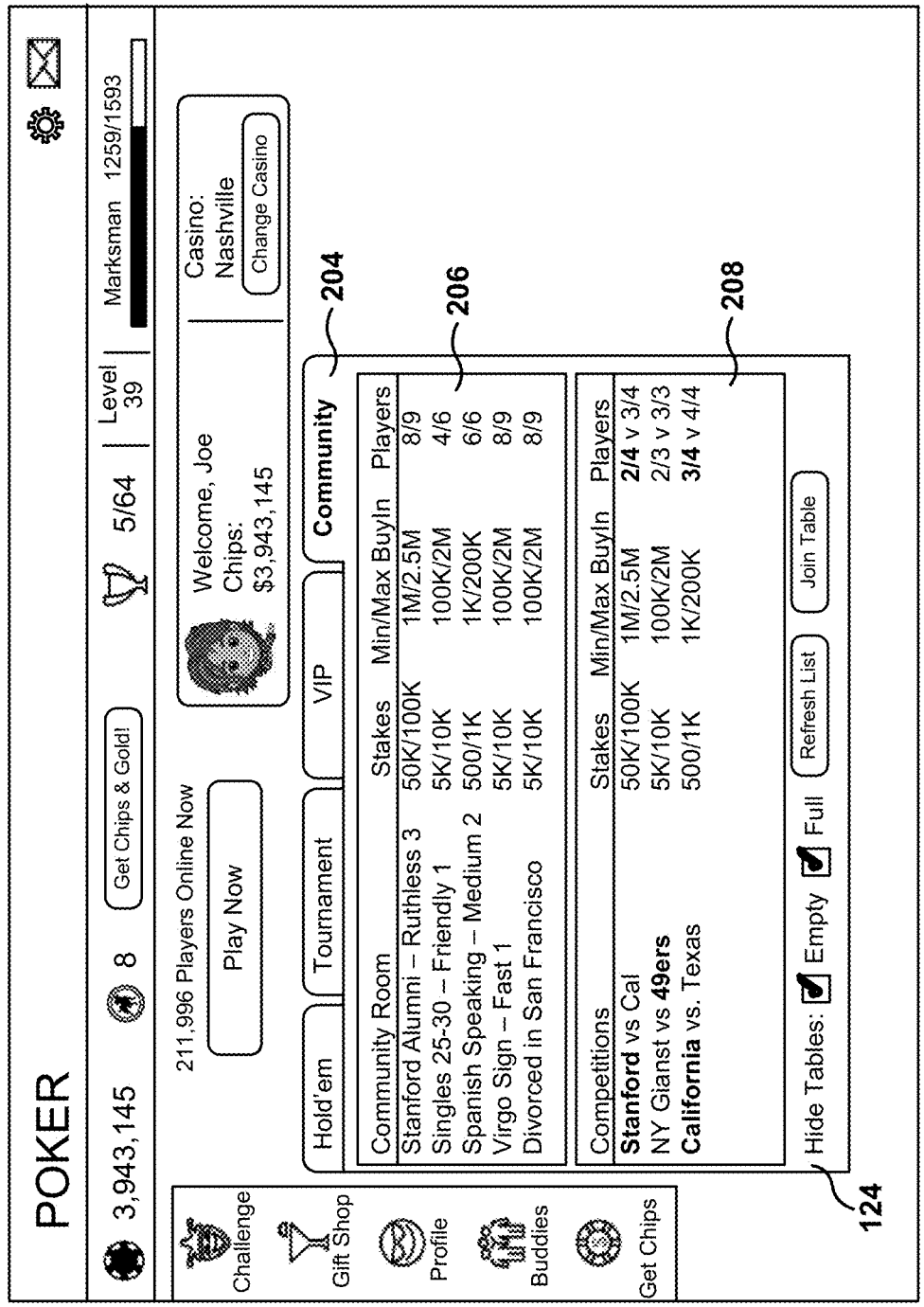
FIG. 2 illustrates a webpage with community poker tables, according to one embodiment.

FIG. 2 illustrates a webpage with community poker tables, according to one embodiment. In some embodiments, communities of users are created based on attributes associated with the players of the online game. As used herein, communities are groups of people that include some of the players in the game and exclude other players in the game, and may also be referred to as teams, sides, squads, crews, clubs, bands, rivalries, or groups.

In one embodiment, the attribute or attributes used to create a community are obtained from attributes from the user profiles. The attribute or attributes may be from profiles in the social network, or from the profile created in the game, or from a combination of attributes from the profile in the social network and the game profile.

As used herein, a characteristic of a community determines which users belong to a community. The characteristic is defined as the attributes or combination of attributes, with their respective values, and the rules for combining the attributes (if more than one attribute is used). For example, a community may be created based on two attributes: a relationship status of married, and an age status between 30 and 40. The attributes used for creating this community are relationship status and age. The attribute values are "married" and "between 30 and 40." The characteristic of this community includes the attributes of marital status and age, the attribute values of "married" and "between 30 and 40," and a logical connector of AND to combine the attribute values. The logical connector for combining attributes may be any logical connector or combinations thereof. For example, the logical connectors may be one or more of logical AND, logical OR, logical NOT, logical XOR, etc.

In one embodiment, the community may be created based on the single attribute. For example, city of residence, high school attended, etc. In one embodiment, a user must match exactly the attribute value to belong to the community (e.g., school attended=Stanford University), and in another embodiment the user must match a value from a range of possible values (e.g., age between 20 and 30 years old).

Some communities utilize a combination of attributes to determine which players belong to the community. For example, a community may be formed for Stanford University singles, which requires that the player must have a relationship status equal to single and have attended Stanford University.

Communities may be formed in many ways, such as by age, geography, gender, religion, political affiliation, being linked to a famous entity on the social network (e.g., people that like the 49ers football team), sports, interests, music affiliations, etc.

The communities may be created "automatically" by the system based on attributes found in the profiles of users. The communities may also be created by game designers that specify characteristics for creating communities. In addition, some communities may also be created by users, which submit request to the game for creating a particular community. The game utilizes community creation rules to accept or deny community requests. More details with reference to the creation of communities are given below with reference to FIG. 5.

In one embodiment, once a community is created, the game network sends invitations to the members of the community to join the game to play in that community. In webpage 202, the user has selected the Community tab 204 within table selection area 124, and the game displays a list of community poker tables where the player may play poker.

In one embodiment, the community tab 204 includes two types of tables. The first type of poker table is a community room table, and the second type of poker table is a competition poker table. The community room table 206 lists poker tables where the user can play, and the competition table 208 lists poker tables where the player may play as a team with other players against a second team.

The game also provides competitions between communities. For example, a poker table may define a competition between Stanford and Yale alumni. This type of competition is referred to herein as a swarm community, team playing, rivalries, competitions, etc. Therefore, a swarm community poker table may include players from two or more communities.

Competition table 208 lists the swarm communities where the player may compete as a team against other teams. In one embodiment, an indicator (e.g., boldface font) is provided to the user to let the user know in which team the user would play.

Figure 3:
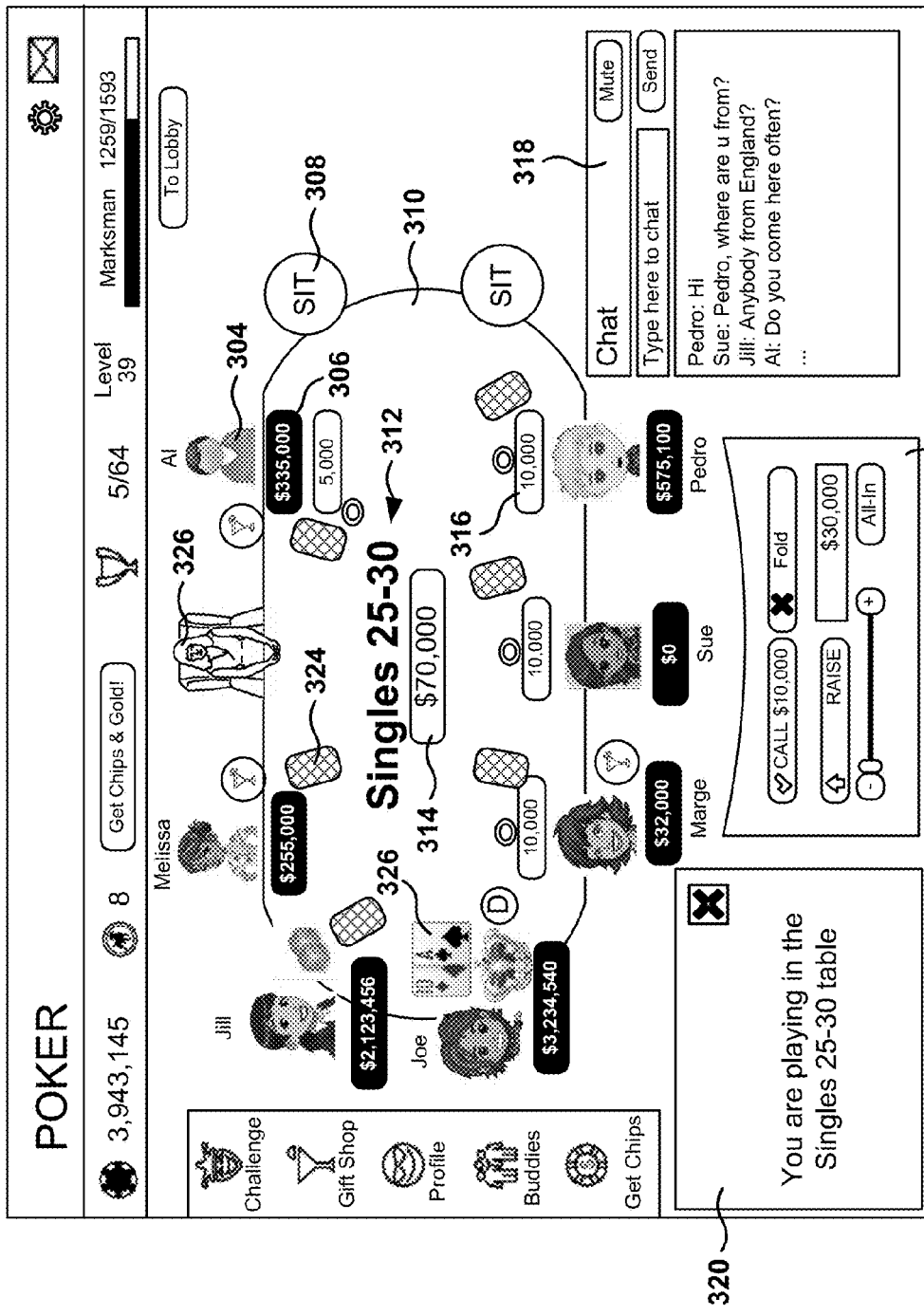
FIG. 3 illustrates a webpage for playing a community poker game, according to one embodiment.

FIG. 3 illustrates a webpage for playing a community poker game, according to one embodiment. A webpage 302 shows a poker community table. As used herein, the term "poker table" may refer to the table where poker is played (e.g., poker table 310), or may also refer to a poker playing area surrounding the poker table. Also, as used herein, a playing area refers to an area in the game where players play together (e.g., a poker table).

In one embodiment, the community poker table may include some marks, designs, decorations, etc., associated with the attribute or attributes that define the community. For example, webpage 302 includes the name of the table 312 embedded within the poker table 310. In addition, a community information area 320 describes information about the community. Other embodiments may include other special decorations to customize the look of the poker table and its environment based on the community. The special decorations may include logos, specially decorated playing cards 324, signs on the walls or floors surrounding the poker table, a custom dealer 326, etc.

The poker table 310 is surrounded by players 304. When a player enters the poker room, the player selects an empty seat 308 to "sit" in that spot. For each player, the game displays the amount of chips 306 available to the player at the table, the amount bet in this hand 316, and, for the player playing the game, the cards held by the player 326. The total amount of the pot 314 is presented in the center of the table 310.

A chat area 318 enables the users to exchange text messages. The messages may be sent to the whole table or to a particular player. In addition, webpage 302 includes a betting area 322 for entering bets, folding, or checking during play.

In one embodiment, the game allows players to get guest passes. A guest pass allows a player that is not part of a community to play in the community poker table or in a swarm community. In order to get a guest pass, in one embodiment, a player belonging to the community requests the guest pass from the game for a specific player, and, if approved, the game sends the guest pass to the invited guest. The guest pass is useful to allow players to play with their friends in their preferred community tables. For example, a player may invite his wife to play in his alumni table. In one embodiment, the guest pass has a limited duration of time, and in another embodiment, a player is limited to the number of guest-pass requests per period of time. However, in one embodiment, a player may buy guest passes using virtual currency or real currency.

It is noted that the embodiments illustrated in FIG. 3 are exemplary. Other embodiments may utilize different layouts, decorations, etc. The embodiments illustrated in FIG. 3 should therefore not be interpreted to be exclusive or limiting, but rather exemplary or illustrative.

Figure 4:
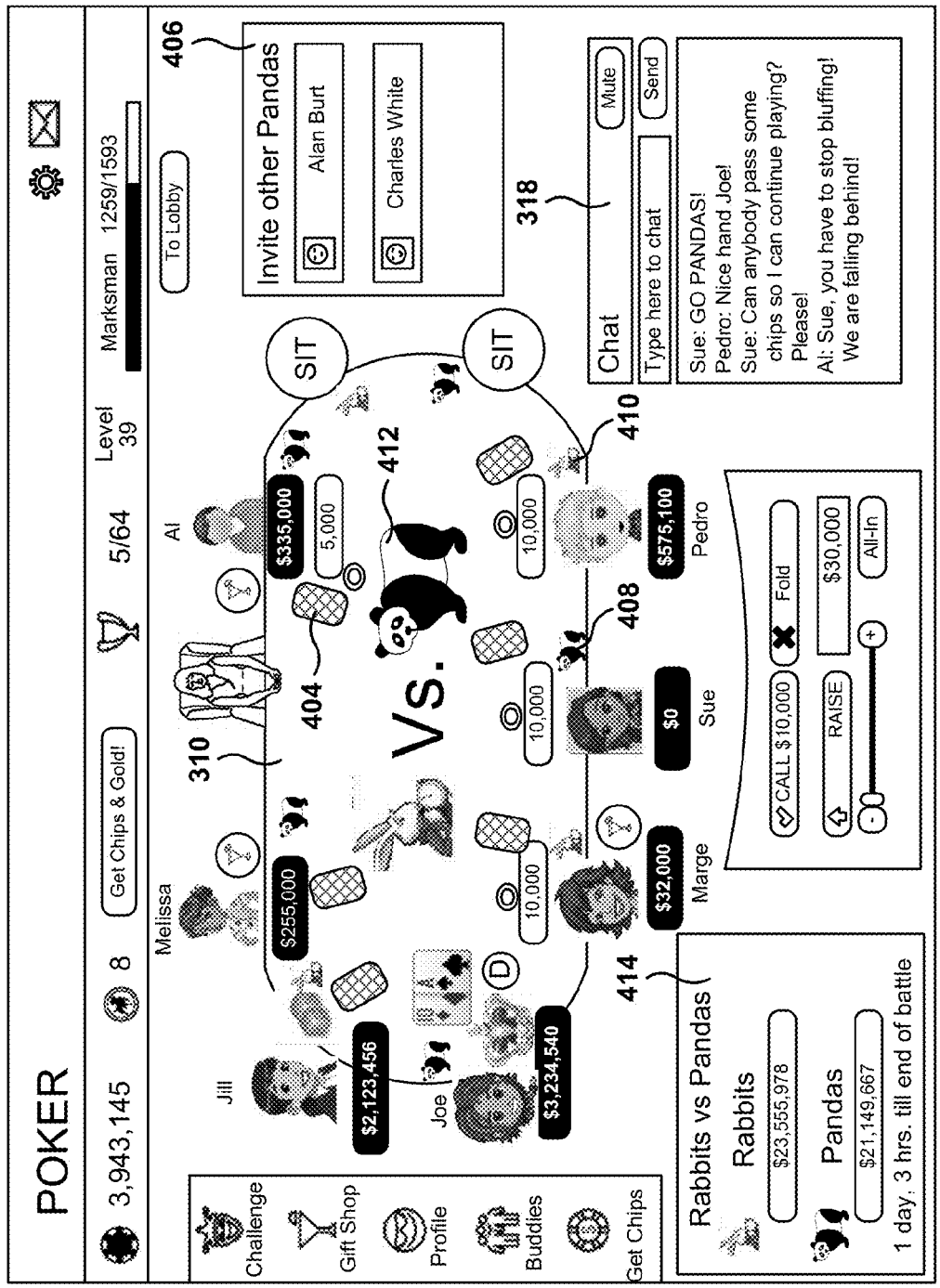
FIG. 4 illustrates a webpage for playing team poker, according to one embodiment.

FIG. 4 illustrates a webpage for playing team poker, according to one embodiment. In one embodiment, webpage 402 for playing team poker (e.g., swarm communities) includes decorations related to the communities associated with the poker table. For example, webpage 402 may include one or more of the name of the table embedded within the poker table 310 (not shown), a swarm community information area 414 (describing information about the community or information related to the competition, such as the score for each of the teams or a leaderboard), special decorations to customize the look of the poker table and its environment based on the swarm community, etc. The special decorations may include logos 412, specially decorated playing cards 324, signs on the walls or floors surrounding the poker table, a custom dealer, etc.

In one embodiment, a leaderboard (not shown) is displayed describing the contribution to the team by players. For example, the leaderboard may display the top 10 chip-winners for a team, although other types of leaderboards are also possible.

Additionally, the poker table may include indicators that show to which community each player belongs. For example, webpage 402 includes logos 408 and 410 associated with the communities competing in the poker table.

In one embodiment, the rivalry poker table includes half the players from one side and the other half from the other side. Of course, since players only sit at the table one at a time, one side may have one more player than the other side at certain times. In this case, a player for the team having more players would not be able to sit at the table until the other team as a player to the table. In another embodiment, there are no limits to the number of players from a team that can sit on the table. For example, 2 players from one team may play against 4 players from the other team.

Once the players are in the game, each player tries to win the most chips for her side. Competition leaderboards in the game display the status of the competitions, including scores, time left until the end of competition, number of players, stakes, betting limits, player leaderboards, etc.

An invitation area 406 includes one or more players that may be invited (e.g., sent an invitation) to play in the game. The members listed in the invitation area 406 may be friends of the player, or may be other random members of the community that are not socially linked with the player.

In one embodiment, the game may create special events that have a limited duration. For example, a poker night may be a competition lasting 12 hours between Stanford and Berkeley alumni. The competition may take place, for example, the day before the game between Stanford and Berkeley football teams. In one embodiment, the game designers create a plurality of swarm communities based on common existing rivalries in real life.

In one embodiment, the game provider may add additional poker tables as the community tables get full. That is, a new community poker table is added when the current community poker table is full, in order to allow more players in the community to play.

In one embodiment, special events may be created (for communities or swarm communities) to raise funds for some cause (e.g., charity, school, political party, etc.). For example, the game provider may give a percentage of earnings in a community poker table to the organization that created the specific event. For example, a charity organization may create a poker night, and the profits (all of the profits or some of the profits) of the poker night will go to the charity organization.

In one embodiment, a special event may require the purchase of a special-event virtual currency, and regular currency may not be used in the special event. This guarantees that players joining the special event contribute to the event by having to buy new currency and not by using the poker chips that may have been accumulated over time.

It is noted that the embodiments illustrated in FIG. 4 are exemplary. Other embodiments may utilize different layouts, decorations, virtual currencies, seating charts, leaderboards, etc. The embodiments illustrated in FIG. 4 should therefore not be interpreted to be exclusive or limiting, but rather exemplary or illustrative.

Figure 5:
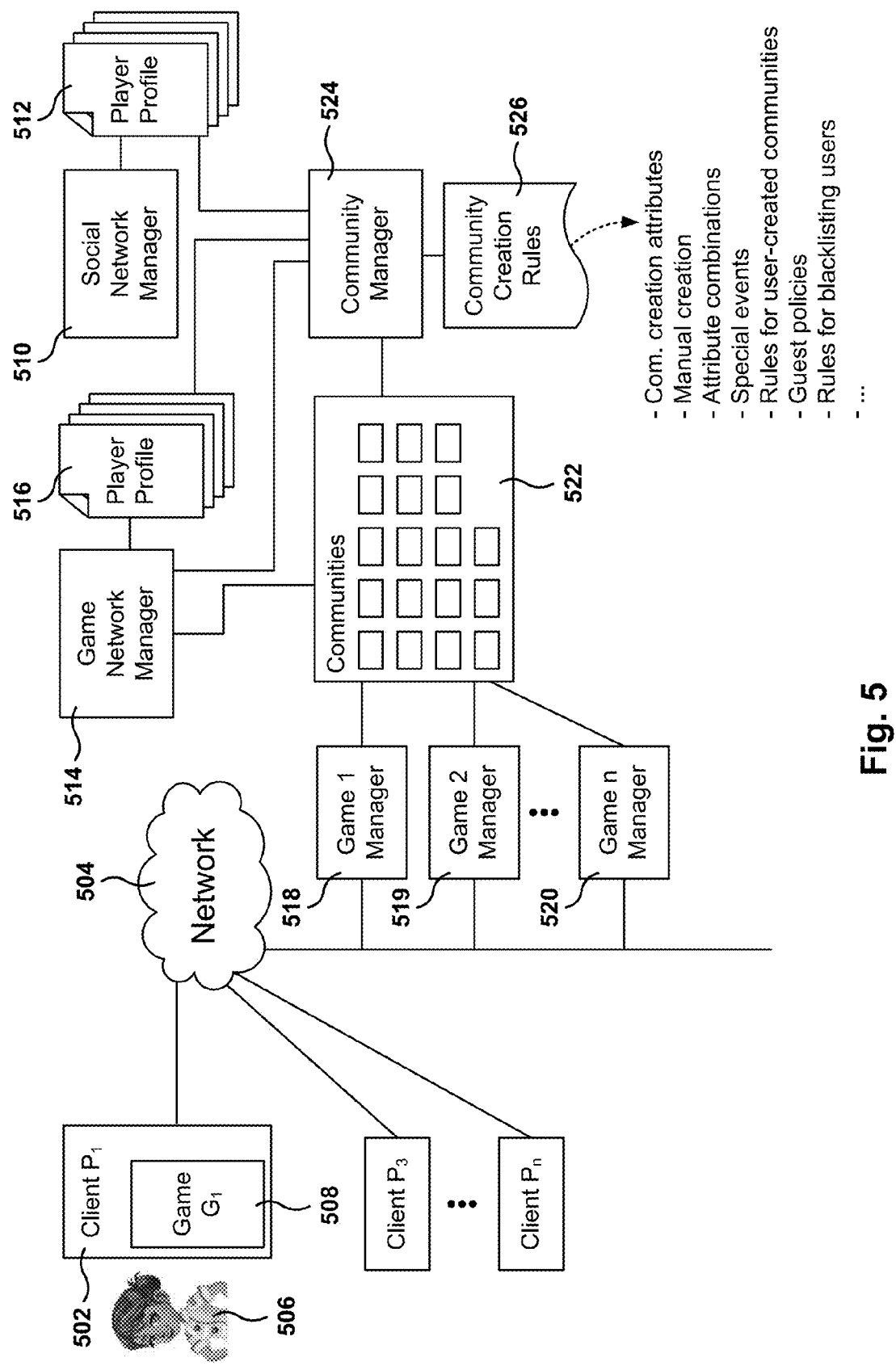
FIG. 5 illustrates the interaction between client and servers in an online game, according to one embodiment.

FIG. 5 illustrates the interaction between client and servers in an online game, according to one embodiment. In one embodiment, the game network includes a game network manager 514 and a plurality of game managers 518-520. Each of the game and managers may include one or more servers to provide online game services to users.

Player $P_1$ 506 plays games utilizing client device 502 executing a computer program. In one embodiment, the client 502 utilizes a web browser 508, and in another embodiment other computer programs may also be utilized to play the game, such as a computer program loaded on a computing device for the exclusive purpose of playing the game. Players connect to the game network and the social network through network 504.

In one embodiment, game 1 manager 518 manages the game operations for each of the players in game 1, and game 1 manager 518 interacts with other modules to perform respective game operations within the game. In one embodiment, game 1 manager 518 provides services to play an online poker game. In addition, the game 1 manager 518 manages the game data stored for running the player's games, although other modules may also access and change some of the game data. In one embodiment, the functionality implemented by game 1 manager 518 includes presenting the game board to the player (e.g., view of the lobby, or the poker room), presenting options to the player for purchasing virtual currency, adding attributes to the profile, purchase game assets, betting, synchronizing game operations with client 502, managing communications with client 502, etc.

Social manager 510 manages the social interactions of the players, which include determining the social links established within the social network. A player profile database 512 includes the attributes added to the profile of players in the social network. The social network provides access to the player profiles 512 via Application Programming Interfaces (APIs) or some other communication mechanisms.

The game network includes a plurality of games, which are provided by the respective game managers 518-520. Game network manager 514 manages the game network, which includes providing common utilities to all the games provided by the same game publisher. The game network manager 514 manages the addition and modifications to the player profiles 516 entered into the game network. The player profile database 516 includes the attributes entered by the players in the game network. In one embodiment, there may be additional game profiles associated with respective games. Embodiments described herein may utilize the attributes entered by players in the game network or in the social network.

Community manager 524 manages the creation of user communities 522 for one or more games. Community manager 524 access profile information from player profiles 516 in the game network, and player profiles 512 from the social network. Community manager 524 uses community creation rules 526 to determine the creation of communities for the game network.

The community creation rules 526 may include instructions from a game administrator to manually create communities. For example, the game administrator may enter commands to create community 1, community 2, community 3, etc. In addition, the game administrator may provide rules to the community manager so users may request the creation of communities. The user-created communities may be used to organize special events, swarm communities around rivalries, etc. In another embodiment, the community manager 524 utilizes logic to create communities by a computer program. For example, community manager 524 analyzes attributes entered by players in their profiles, identifying characteristics that affect a plurality of players to create communities based on the identified characteristics.

The rules for user-created communities may include one or more of listing a plurality of users for the community, defining one or more attribute values to create a community, defining an open community to be used in a special event for fund raising, enable the combination of attribute values to create a community, logic rules to identify which user-created communities are possible (e.g., a community must have a minimum number of players, or a community may not exceed a predetermined number of players), rules for blacklisting users (e.g., ejecting players from a community for bad online behavior), rules for reporting bad behavior in the community, etc. In addition, community creation rules 526 may also include rules or policies for enabling guests into a community.

In one embodiment, the community creation rules 526 may also include data regarding special decorations or characteristics for community playing area (e.g., poker room). In one embodiment, a special lobby is created for one or more of the communities 522. The special lobby may include leaderboard information and other community-related information.

To request the creation of a user-created community, a player may send a request to the game network manager 514 to add a new community. The game network manager 514, in cooperation with community manager 524, provides an interface to the requester for creating a community. In one embodiment, the interface includes the selection of one or more attributes from player profiles, their respective allowed values for the attributes, and how to combine the attributes, if more than one attribute is provided.

It is noted that the embodiments illustrated in FIG. 5 are exemplary. Other embodiments may utilize different game modules, different data modules, combine the functionality of one or more modules into a single module, etc. The embodiments illustrated in FIG. 5 should therefore not be interpreted to be exclusive or limiting, but rather exemplary or illustrative.

Figure 6:
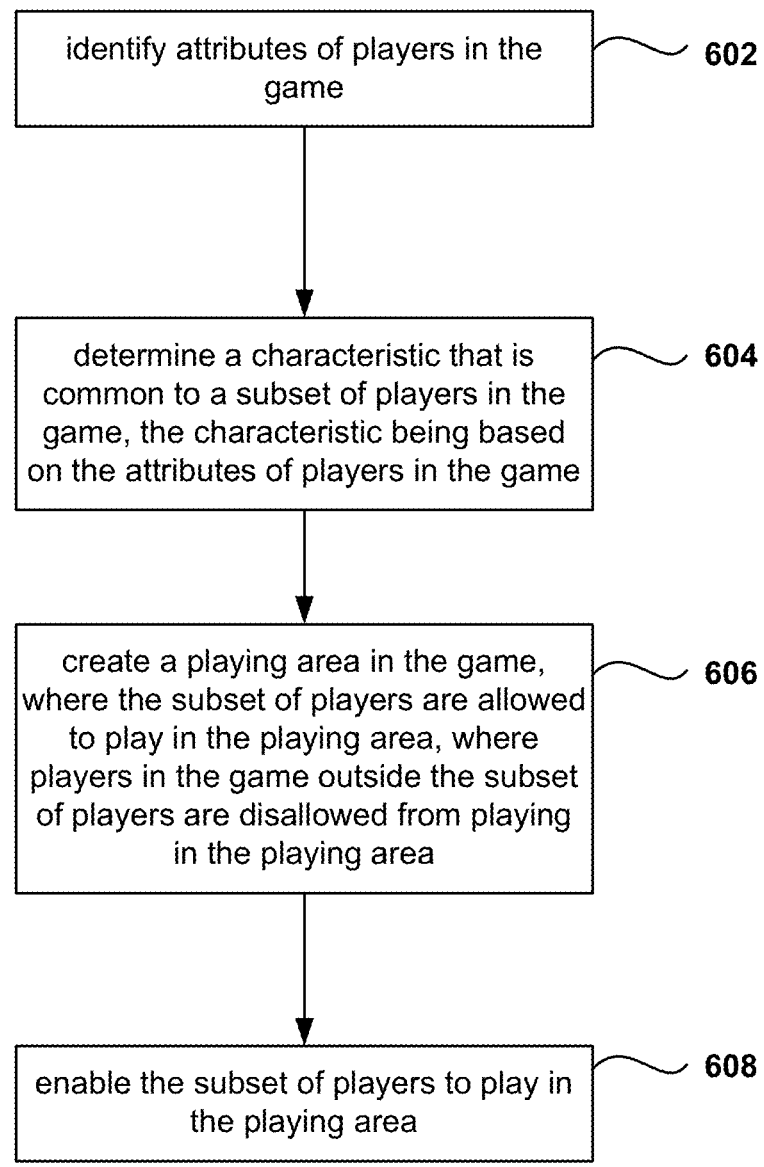
FIG. 6 is a flowchart illustrating an algorithm for providing user communities in an online game, according to one embodiment.

FIG. 6 is a flowchart illustrating an algorithm for providing user communities in an online game, according to one embodiment. In operation 602, the attributes to create a community are identified. From operation 602, the method flows to operation 604 where a community characteristic is determined to identify the players that belong to the community. The characteristic is common to the subset of players in the game that belong to the community. Of course, there is a second subset of players in the game that do not belong (i.e., are absent) from the community. The characteristic defines the attribute or attributes, their respective values, and how the attributes are combined to identify which players belong to the community.

In one embodiment, the attributes may include one or more of city of residence, school attended, age, relationship status, employer, interests, or relative relationship (e.g., cousin). In another embodiment, the characteristic is defined by a single attribute and a single value for the attribute (e.g., marital status equal to married).

From operation 604, the method flows to operation 606 where a playing area is created in the game for the community. In one embodiment, the playing area is a poker table, but other playing areas may be created for other games (e.g., blackjack table, roulette table, battleground, etc.). The subset of players identified by the characteristic are allowed to play in the playing area, and the players in the game that are not in the subset of players are disallowed from playing in the playing area.

From operation 606, the method flows to operation 608, where the subset of players, previously identified in operation 606, is enabled (i.e., allowed) to play in the playing area.

Figure 7:
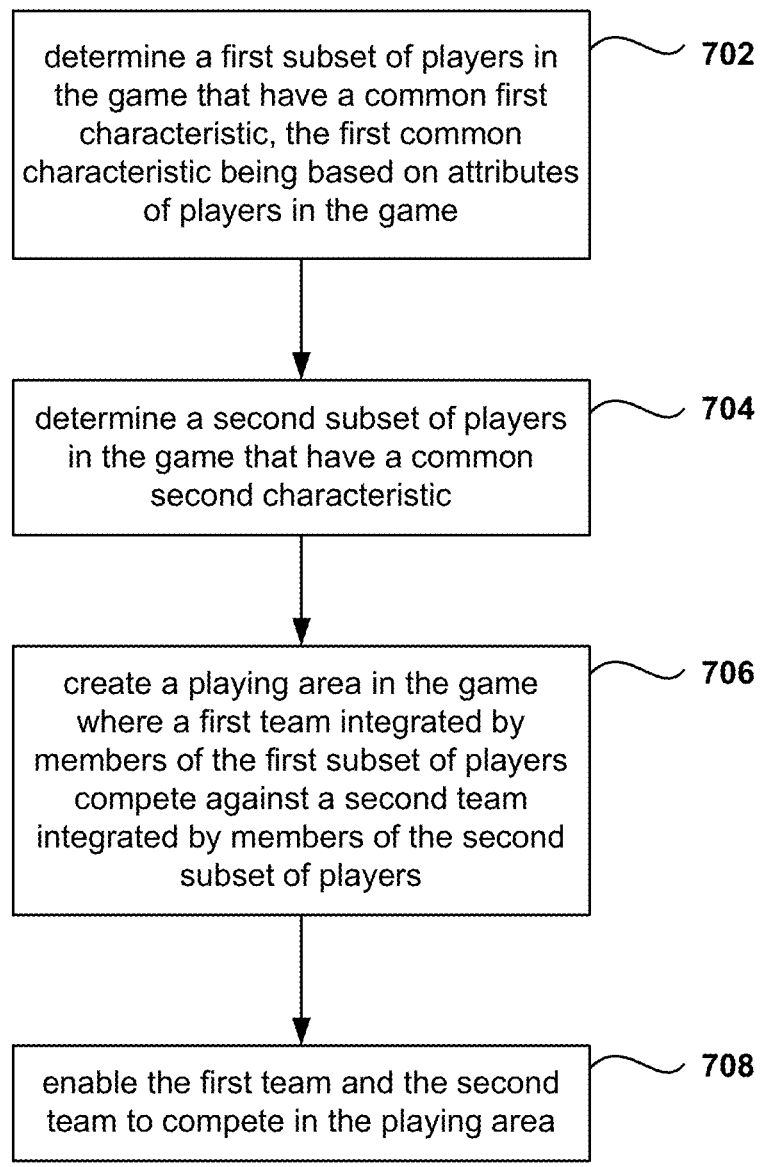
FIG. 7 is a flowchart illustrating an algorithm for providing team competitions in an online game, according to one embodiment.

FIG. 7 is a flowchart illustrating an algorithm for providing team competitions in an online game, according to one embodiment. In operation 702, the game determines a first subset of players that have a common characteristic. The first characteristic is based on attributes of players in the game. In one embodiment, the attributes of players correspond to attributes entered by the player in a social network profile or in the game profile.

From operation 702, the method flows to operation 704 where a second subset of players is determined by the game.

The second subset of players has a second characteristic which is based on attributes of the players in the game.

From operation 704, the method flows to operation 706 where a playing area is created in the game. The playing area provides an arena for two or more teams of players to compete. In one embodiment, a first-team and a second team are formed in the playing area. The first team is integrated by members of the first subset of players, and the second team is integrated by members of the second subset of players.

From operation 706, the method flows to operation 708 where the first team and the second team are enabled to compete in the playing area. In one embodiment, the game is a game of online poker and the playing area is a poker table.

Figure 8:
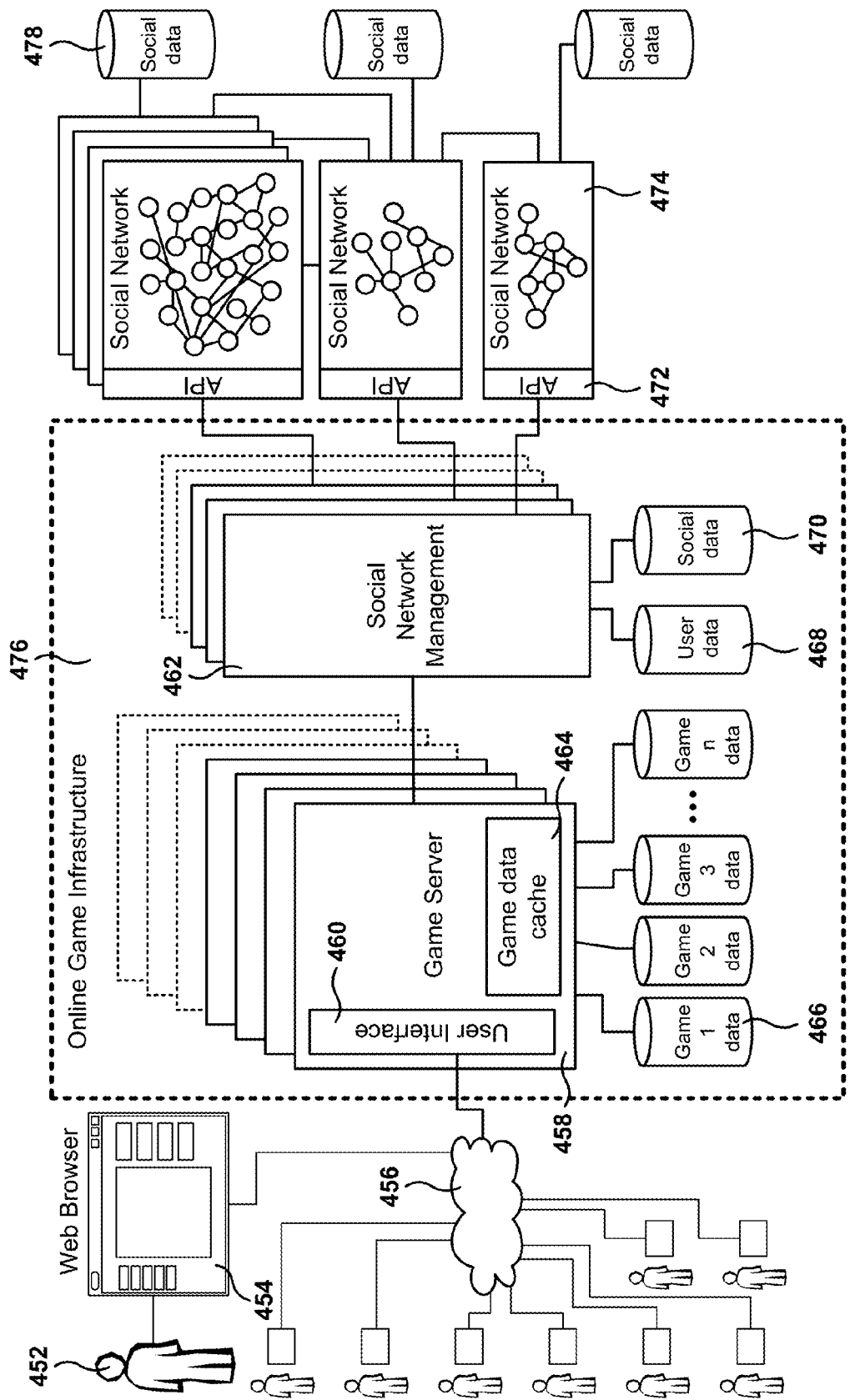
FIG. 8 illustrates an implementation of a Massively Multiplayer Online (MMO) infrastructure, according to one embodiment.

FIG. 8 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 8 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 8 should therefore not be interpreted to be exclusive or limiting, but rather exemplary or illustrative.

Figure 9:
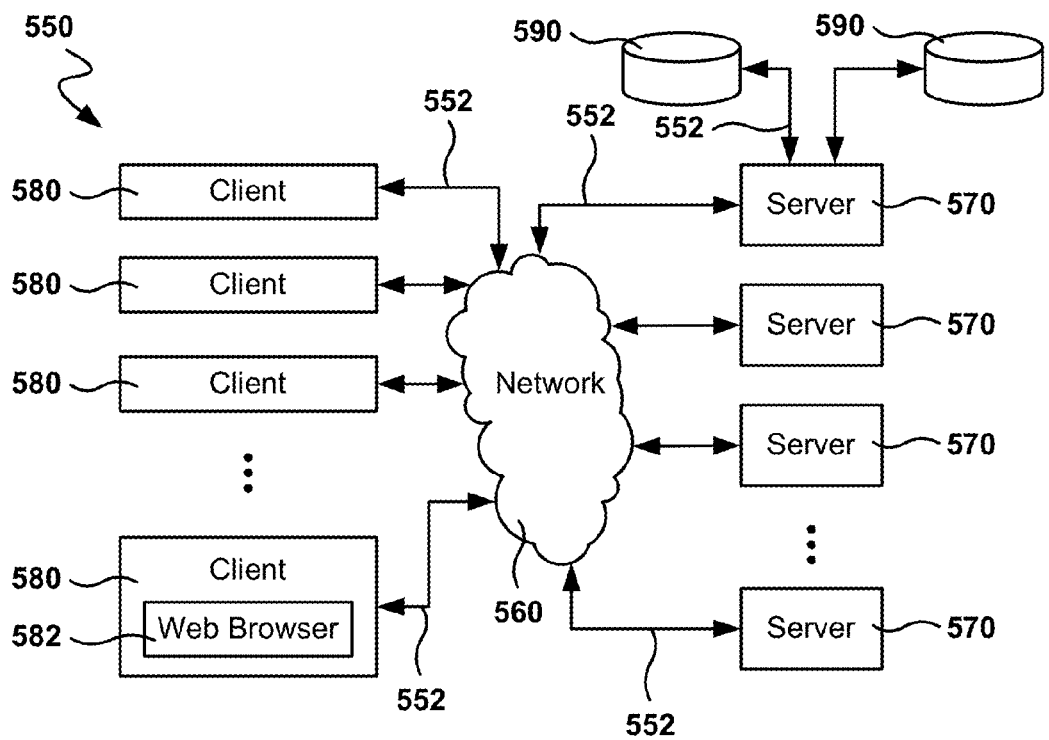
FIG. 9 illustrates an example network environment suitable for implementing embodiments.

FIG. 9 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, community server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 10:
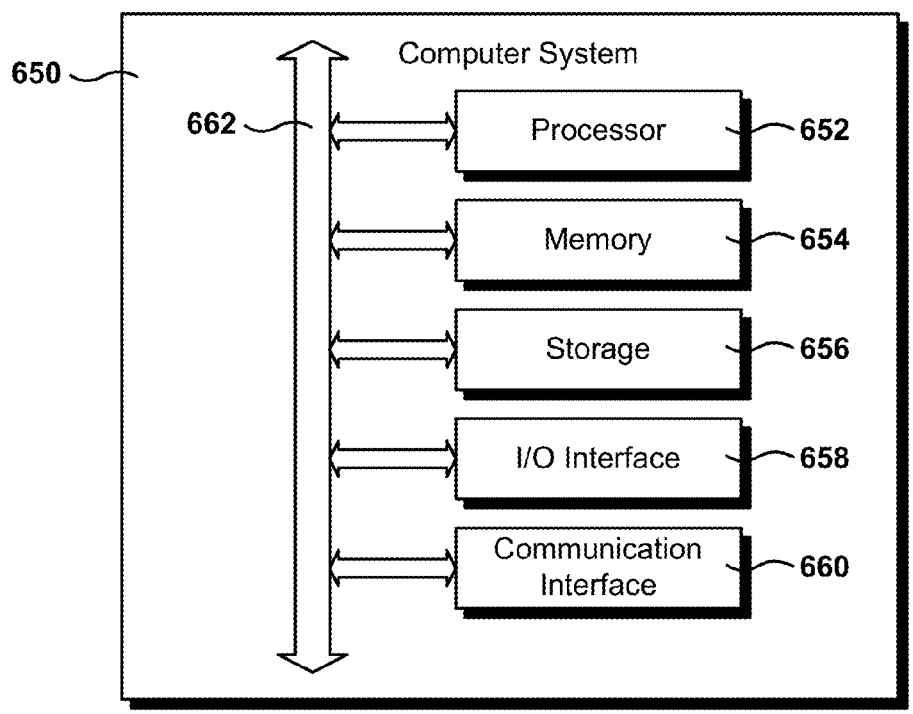
FIG. 10 illustrates an example computer system for implementing embodiments.

FIG. 10 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A processor-implemented method for executing a game, the method comprising:
retrieving from a social network server, by a social manager module of the game, social network profiles from players of the game, the social network profiles including player information associated with each player which is a member of the social network;
identifying, by a community manager module of the game, attributes of players in the game found in the retrieved social network profiles;
determining, by the community manager module of the game, a characteristic that is common to a subset of players in the game, the characteristic being based on the attributes of players in the game;
creating, by a game manager module of the game, a playing area in the game, wherein the subset of players is allowed to play in the playing area, wherein players in the game outside the subset of players are disallowed from playing in the playing area;
providing an option to a first player to invite a second player to play in the playing area, wherein the second player does not belong to the subset of players; and
enabling the subset of players and the second player to play in the playing area, wherein the operations of the method are executed by a processor.

2. The method as recited in claim 1, further including:
receiving second attributes of players that are entered by the players in a user profile in the game.

3. The method as recited in claim 1, wherein the characteristic is a value of a predetermined attribute.

4. The method as recited in claim 1, wherein the characteristic is based on values from a plurality of attributes.

5. The method as recited in claim 1, wherein the attribute is one or more of city of residence, school attended, age, relationship status, employer, interests, or family relative.

6. The method as recited in claim 1, wherein the playing area is an area for playing a casino game.

7. The method as recited in claim 1, further including:
presenting to a first player a list of playing areas allowed for the first player based on the attributes of the first player.

8. The method as recited in claim 1, wherein creating the playing area further includes:
adding to the play area decorations associated with the determined characteristic.

9. The method as recited in claim 1, wherein the decorations include one or more of logos associated with the characteristic, or playing cards associated with the characteristics, or signs associated with the characteristic.

10. A processor-implemented method for executing a game, the method comprising:
identifying attributes of players in the game;
determining a characteristic that is common to a subset of players in the game, the characteristic being based on the attributes of players in the game;
creating a playing area in the game, wherein the subset of players is allowed to play in the playing area, wherein players in the game outside the subset of players are disallowed from playing in the playing area;
providing an option to a first player to invite a second player to play in the playing area, wherein the second player does not belong to the subset of players; and
enabling the subset of players and the second player to play in the playing area, wherein the operations of the method are executed by a processor.

11. The method as recited in claim 10, further including:
sending an invitation from the game to the second player to play in the playing area.

12. The method as recited in claim 10, wherein providing the option to the first player further includes:
providing an option to the first player to buy a guest pass for the invitation with game currency or real currency.

13. A processor-implemented method for executing a poker game, the method comprising:

retrieving from a social network server, by a social manager module of the poker game, social network profiles from players of the poker game, the social network profiles including player information associated with each player which is a member of the social network;

identifying, by a community manager module of the poker game, attributes of players in the poker game;

determining, by the community manager module of the poker game, a characteristic that is common to a subset of players in the poker game, the characteristic being based on the attributes of players in the game;

creating, by a game manager module of the game, a first poker table for a special event to raise funds for an organization, wherein the subset of players is allowed to play in the first poker table, wherein players in the game outside the subset of players are disallowed from playing in the first poker table, wherein the first poker table is played with a special-event virtual currency which is different from a regular currency used by players of the poker game outside the special event;

enabling the subset of players to play in the first poker table;

providing an option to a first player to invite a second player to play in the first poker table, wherein the second player does not belong to the subset of players, and enabling the second player to play in the first poker table; and providing funds to the organization after ending the poker game in the first poker table, wherein the operations of the method are executed by a processor.

14. The method as recited in claim 13, further including:
adding a second poker table for the subset of players when the first table gets full.

15. The method as recited in claim 13, further including:
sending an invitation to the subset of players to play in the first poker table.

16. The method as recited in claim 13, further including:
presenting to a first player a list of tables available to the first player based on the attributes of the first player.

17. The method as recited in claim 13, wherein providing funds to the organization further includes:
giving a percentage of earnings from the poker game to the organization.

* * * * *